US006870335B2

(12) United States Patent
Lindström et al.

(10) Patent No.: US 6,870,335 B2
(45) Date of Patent: Mar. 22, 2005

(54) METHOD AND ARRANGEMENT FOR CONTROLLING A DRIVE SYSTEM

(75) Inventors: Johan Lindström, Ösmo (SE); Krister Fredriksson, Kyrkesund (SE)

(73) Assignee: Volvo Personvagnar AB, Göteborg (SE)

( * ) Notice: Subject to any disclaimer, the term of this patent is extended or adjusted under 35 U.S.C. 154(b) by 29 days.

(21) Appl. No.: 09/682,496

(22) Filed: Sep. 7, 2001

(65) Prior Publication Data

US 2002/0049120 A1 Apr. 25, 2002

(30) Foreign Application Priority Data

Sep. 7, 2000 (SE) ............................................. 0003160

(51) Int. Cl.$^7$ ................................................ H02P 7/00
(52) U.S. Cl. ....................... 318/432; 318/430; 318/434; 318/138; 318/254; 318/700
(58) Field of Search ................................ 318/138, 254, 318/430, 432, 434; 701/84, 87, 151; 477/90, 91, 174

(56) References Cited

U.S. PATENT DOCUMENTS

| 5,185,543 | A | * | 2/1993 | Tebbe | .......................... | 310/51 |
| 5,735,770 | A | * | 4/1998 | Omote et al. | ................... | 477/5 |
| 5,993,355 | A | * | 11/1999 | Nordgard | ..................... | 477/174 |
| 6,039,028 | A | | 3/2000 | Stuntz et al. | | |
| 6,085,723 | A | | 7/2000 | Pels et al. | | |
| 6,148,784 | A | * | 11/2000 | Masberg et al. | .......... | 123/192.1 |
| 6,505,109 | B1 | * | 1/2003 | Strandell et al. | ............. | 701/151 |

FOREIGN PATENT DOCUMENTS

| DE | 19839315 A1 | 3/2000 | | |
| EP | 0916539 A2 | 5/1999 | | |
| EP | 0934844 A2 | 8/1999 | | |
| GB | 2346351 A | 8/2000 | | |
| GB | 2346351 A | * 9/2000 | ............ | F16F/15/18 |
| WO | WO 9708440 A1 | 3/1997 | | |
| WO | WO 0003163 A | 1/2000 | | |

* cited by examiner

*Primary Examiner*—David Martin
*Assistant Examiner*—Tyrone Smith
(74) *Attorney, Agent, or Firm*—Fitch, Even, Tabin & Flannery

(57) ABSTRACT

The invention relates to a method for taking up play in a drive system when a change in load occurs. The drive system comprises a drive engine, preferably an internal combustion engine, coupled to a drive line in a vehicle, an electric motor which acts on the drive engine and/or the drive line with a driving or braking torque, and which motor is coupled to the drive engine or constitutes a part of the drive line, and a control system for controlling the electric motor. The control system sends a pulse to the electric motor when a change in load occurs, a torque pulse taking up play in the drive line before a torque stage from the drive engine begins. The size of the pulse is selected from a matrix stored in a memory, depending on the current operating conditions. The invention also relates to an arrangement for implementing the method.

23 Claims, 3 Drawing Sheets

METHOD AND ARRANGEMENT FOR CONTROLLING A DRIVE SYSTEM

CROSS REFERENCE TO RELATED APPLICATIONS

The present application claims priority to Swedish Application No. 0003160-9, filed 7 Sep. 2000.

BACKGROUND OF INVENTION

1. Technical Field

The present invention relates to a method for taking up play in a drive line when a change in load occurs in a drive system in a motor vehicle. The invention also relates to an arrangement for implementing the method.

2. Background Information

In modern motor vehicles, vibrations can sometimes occur in the drive line. In this context, drive line means all the component parts of the transmission between the output crankshaft of the engine and the driving wheel axles. Vibrations may arise, for example, if there is play in the drive line when torque is applied to the latter from the engine. This play can also occur during engine braking, when a negative torque loads the drive line and winds the latter up like a torsion spring. When the throttle is opened, the drive line is subjected to a positive torque, which means that it is subjected to a change in load. This change in load, when the torque applied to the drive line changes from braking to driving, can bring about a jerk with subsequent vibrations throughout the drive system. The main cause of this jerk is an unchecked acceleration of the flywheel when the drive line passes through play in the line.

Apart from being an unpleasant sensation for the driver and passengers, these vibrations can give rise to unnecessary wear on the drive line. Under certain circumstances, for example, on curves or on slippery surfaces, variations in the torque delivered to the driving wheels can cause dangerous traffic situations.

Referring to International Patent No. WO 97/08440, for example, a drive system arrangement including an electrical machine and a method for implementing the electrical machine in the drive system is taught. The electric motor is coupled to the drive line for regulating torque fluctuations. By measuring the torque on the drive line and feeding these measured values back to a control system, the electric motor can be continuously regulated so as to counteract jerks and vibrations associated with changes in load. The disadvantage of this system is that it is relatively complicated and requires a control system capable of reacting to rapid variations that can occur in the drive line. If vibrations arise for which the control system is not programmed, there may be problems in damping these quickly enough. The system is moreover intended for counteracting vibrations in the drive line as a function of measured torque variations; that is to say, the system reacts only when a jerk has started to occur and/or when the vibrations can be measured.

Other known solutions include holding back the internal combustion engine so that the change in torque of the engine is zero when the drive line passes through the play. This can be accomplished by damping the movement of the throttle (for an electric throttle), resulting in inferior response, or by reducing the ignition and/or regulating the air and/or fuel supply, resulting in higher fuel consumption in addition to inferior response.

SUMMARY OF INVENTION

The present invention provides a drive system that minimizes jerks and vibrations caused by play in the drive line when a change in load occurs by giving the drive line a certain preloading. This is achieved by a method for taking up play in a drive system when a change in load occurs. The method includes the steps of coupling a drive engine to a drive line in a vehicle, acting on the drive engine and/or the drive line with a driving or braking torque by an electric motor, wherein the motor is coupled to the drive engine or constitutes a part of the drive line, and controlling the electric motor by a control system, wherein the control system sends a pulse to the electric motor when a change in load occurs, thereby prompting a torque pulse from the electric motor to take up play in the drive line before torque from the drive engine occurs. The present invention further provides for an arrangement in a drive system that minimizes the above described jerks and vibrations. The drive system arrangement includes a drive engine coupled to a drive line in a vehicle, an electric motor able to act on the drive engine and/or the drive line with a driving or braking torque, and a control system for controlling the electric motor. The control system is arranged so as to send a short pulse to the electric motor when a change in load occurs, and the electric motor is able to generate a torque pulse for the purpose of taking up play in the drive line before a torque stage or torque from the drive engine occurs.

The method according to the invention takes up or preloads play in a drive system when a change in load occurs. In this connection, the drive system comprises a drive engine, preferably an internal combustion engine, coupled to a drive line in a vehicle, an electric motor that acts on the drive engine and/or the drive line with a driving or braking torque, the motor being coupled to the drive engine or constituting a part of the drive line, and a control system for controlling the electric motor. The electric motor preferably includes an integrated starter motor and generator ("ISG"), which can be coupled to the crankshaft of the engine directly or via a transmission, for example, by a chain. An ISG can also be positioned elsewhere in the drive line after the drive engine, for example, close to the gearbox. When the control system senses that a change in load is directly imminent, a pulse is sent to the electric motor, which in turn generates a torque pulse that takes up the play in the drive line.

In order to achieve this, the control system is provided with input data from the drive engine so that it can detect an imminent change in load and react to this before torque from the drive engine is applied to the drive line. This is possible because of the time delay that occurs between the driver's request to the engine control system and the drive engine's delivery of torque. This delay occurs for various reasons, including the time it takes for the engine control system to adjust fuel injection and ignition, and the drive engine overcoming a certain moment of inertia in order to be able to increase revolutions and deliver torque.

The control system measures torque applied to the drive line in terms of current operating conditions, and calculates the current play in the drive line on this basis. Based upon these values, the control system selects the height and duration of the pulse from a matrix stored in memory. The pulse can have varying forms, such as an individual square pulse, a repeated square pulse with uniform or varying intervals, a ramped or sawtooth-shaped pulse, or a sinusoidal pulse, which can have both positive and negative values. It is important that the pulse, irrespective of shape, height and duration, is sent only once when an imminent change in load is detected. The pulse is sent to the electric motor, which generates a torque pulse that will take up the play in the drive line. If the pulse has been selected correctly, the drive line will be preloaded when the torque stage from the drive engine is applied, thereby avoiding jerks and vibrations in the system.

Still, situations may arise for which the matrix of the control system has not been prepared. These can include, unexpected or extreme operating conditions with torques not found in the matrix, or wear of parts in the drive line, resulting in the amount of play in the line increasing over time. Pulses which are too great can affect the electric motor torque pulse, causing jerks or vibrations, while pulses which are too small result in torque pulses from the motor that does not completely take up the play in the drive line. Accordingly, the control system also measures the degree to which the torque pulse takes up play in the drive line. The size of the pulses in the matrix can thus be corrected on the basis of how torque pulses from the electric motor have taken up play. In addition to correcting existing values of the height and/or duration of the pulse in the matrix, it is also possible to add new values for situations not included. In this respect, the system does not have direct feedback for continuous regulation, but is self-learning in such a manner that it adapts the functioning of the control system by checking the effect of earlier sent pulses on the play in the drive line.

Other advantages of the system, in addition to reduced wear and improved safety, include controlling the drive line with greater accuracy and more stability. Engine response can also be improved because less regulation of the drive engine and the electric motor is required. This permits reduction in fuel consumption, due to the injection system requiring fewer instructions from the control system of the engine, thereby allowing it to operate more evenly.

BRIEF DESCRIPTION OF DRAWINGS

The invention will be described in more detail below with reference to examples shown in the accompanying drawings, wherein.

DETAILED DESCRIPTION

Figure 1:
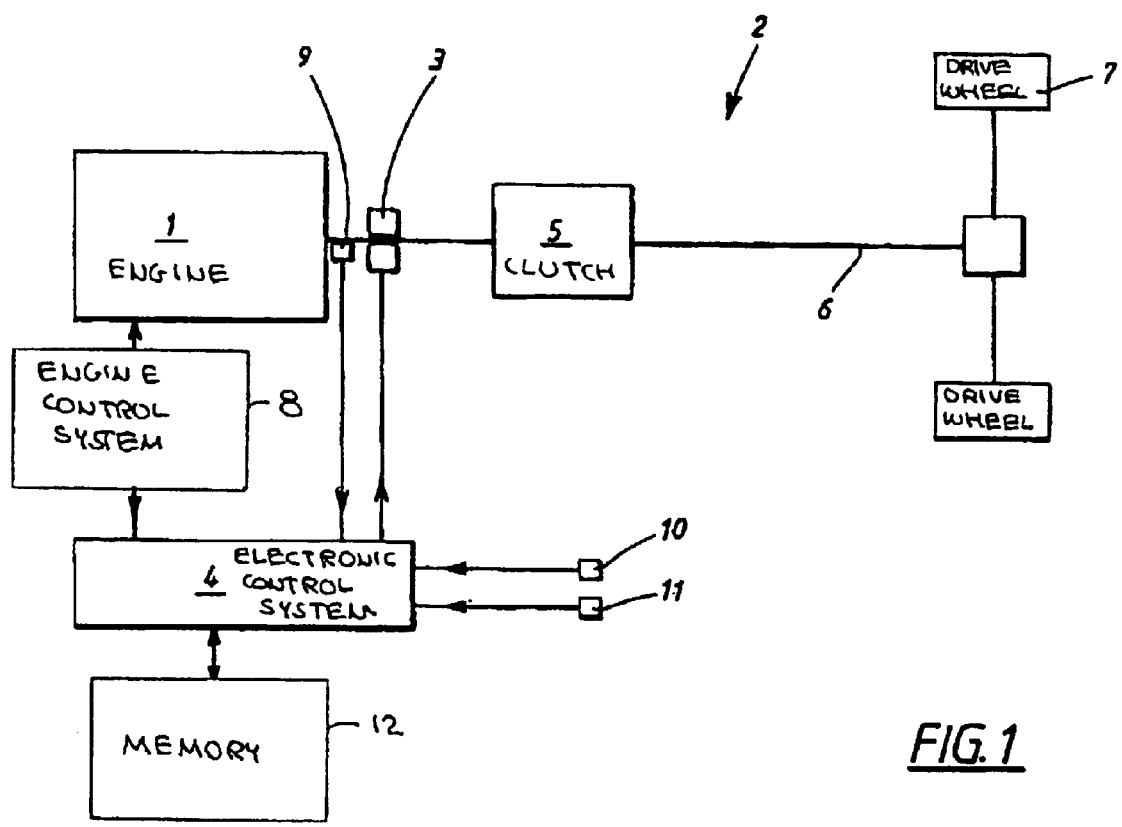
FIG. 1 is a block diagram of the drive system of a vehicle.

Referring to FIG. 1, a block diagram of a preferred embodiment of the invention is illustrated comprising a drive system with an internal combustion engine 1 coupled to a drive line 2, an electric motor 3, preferably in the form of an ISG, and an electronic control system 4 for the electric motor 3. The drive line 2 comprises a gearbox with clutch 5 and a driving shaft 6 between the gearbox 5 and the drive wheels 7. The invention can be applied to both front-wheel and rear-wheel drive vehicles, and also to four-wheel drive vehicles.

The control system 4 is coupled to an engine control system 8 for the drive engine 1 for obtaining data regarding the action of the driver on the throttle of the engine. The control system 4 is further coupled to at least one sensor for measuring torque on the drive line 2. A first sensor 9 is preferably positioned close to the output shaft of the drive engine 1. In order to monitor how the drive system is affected under different operating conditions, additional torque sensors 10, 11 can be positioned on suitable parts of the drive line 2. In order for it to be possible to control the electric motor 3 under different operating conditions, the control system 4 is provided with a memory 12. The memory 12 contains data in a matrix, with the value of the pulse sent to the electric motor 3 selected based on the input signals the control system 4 receives from the engine control system 8 and one or more torque sensors 9–11.

It should be understood that the sensors are not a required element of the invention, and that there are other means of determining torque. For example, it is possible to construct a system without torque sensors by estimating the size of the torque. This can be done with great accuracy, either empirically or by means of previous measurements.

The functioning of the system can be seen from the diagrams in FIGS. 2A–D, which illustrate various torque values over time. In an operating situation where the vehicle is engine-braked and the driver wishes to open the throttle, a request for torque $M_R$ is sent to the engine control system 8. The time $t_R$ at which the torque request $M_R$ occurs is detected by the control system 4. As can be seen from FIG. 2A, which shows requested torque $M_R$ as a function of time, and 2B, which shows torque delivered by the drive engine $M_C$ as a function of time, a time delay $t_D$ occurs between the time $t_R$ the request for torque $M_R$ is made and the time the drive engine delivers torque $M_C$. This delay arises due to the time it takes for the engine control system to adjust air supply, fuel injection and ignition, in addition to the amount of inertia drive engine has to overcome from its moving parts in order to increase revolutions before torque can be delivered.

The control system 4 detects a torque request $M_R$ as soon as it has been sent to the engine control system 8. By means of the torque measured by the sensor 9, the control system 4 can calculate the size of the existing play in the drive line 2. This play consists of the angle through which the entire drive line 2 has to be rotated from its engine-braking position in order to be able to take up a driving torque from the drive engine without jerks or vibrations occurring in the drive system. This calculated play—the size of the braking torque $M_B$ and the size of the requested torque $M_R$—forms the basis for the selection made by the control system 4 of a suitable pulse from the matrix in the memory 12. At time $t_T$, a pulse is triggered from the control system 4 to the electric motor 3. The delay from the time $t_R$ of the torque request to the time $t_T$ of triggering of the electric motor 3 is very short, preferably shorter than about 300 ms.

Figure 2A:
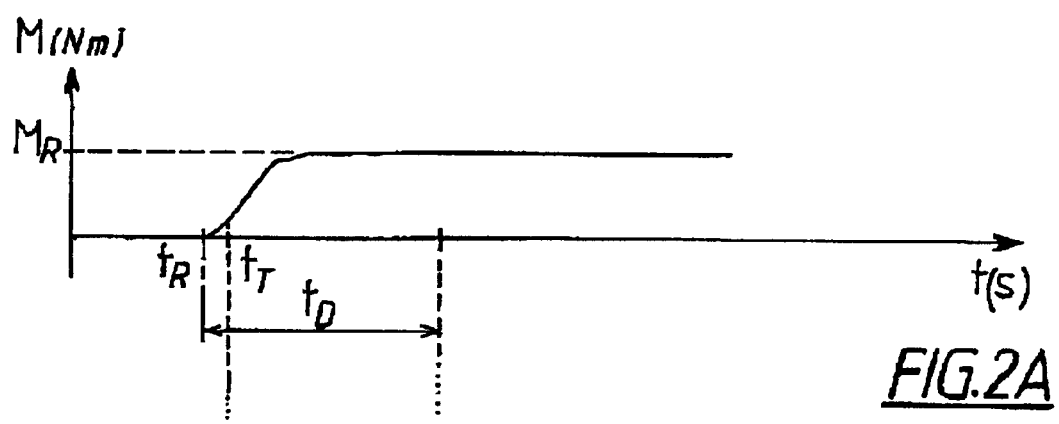
FIG. 2A illustrates a torque curve with torque requested by the driver.
Figure 2B:
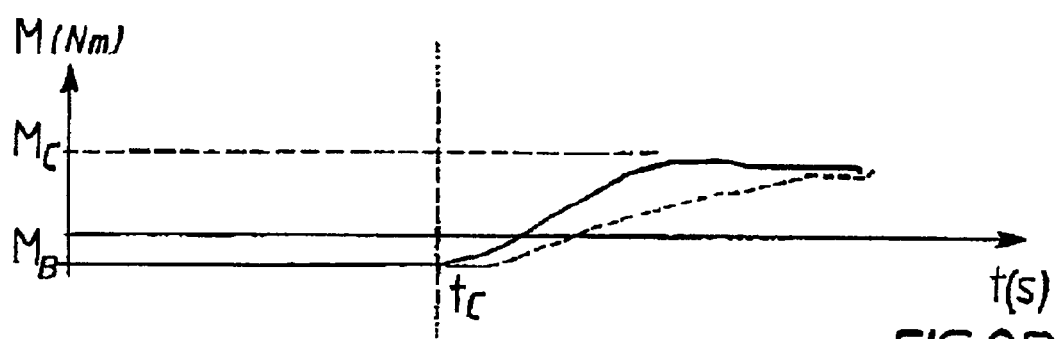
FIG. 2B illustrates a torque curve with torque delivered by the engine.
Figure 2C:
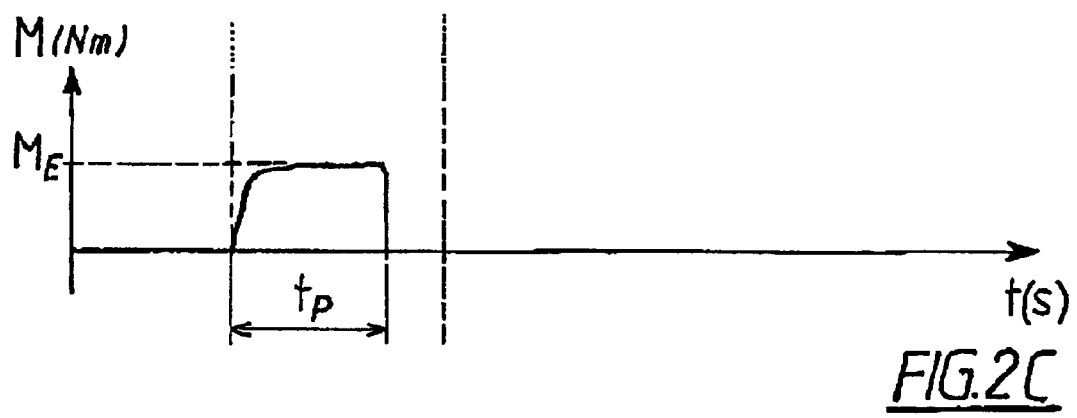
FIG. 2C illustrates a torque curve for a torque pulse from the electric motor.

As can be seen from FIG. 2C, which shows torque $M_E$ delivered from the electric motor 3 as a function of time, the motor emits a torque pulse proportional to the pulse predetermined by the matrix of the control system 4. The motor 3 generates the torque $M_E$ for a predetermined period of time $t_P$. The torque pulse is delivered to the drive line 2 during the delay $t_D$ between the time $t_R$ of the request for torque and the time $t_C$ when the torque stage up to the torque $M_C$ delivered from the engine begins. By using an electric motor, the torque pulse can be controlled with great accuracy and in rapid processes on account of its short time constant.

Figure 2D:
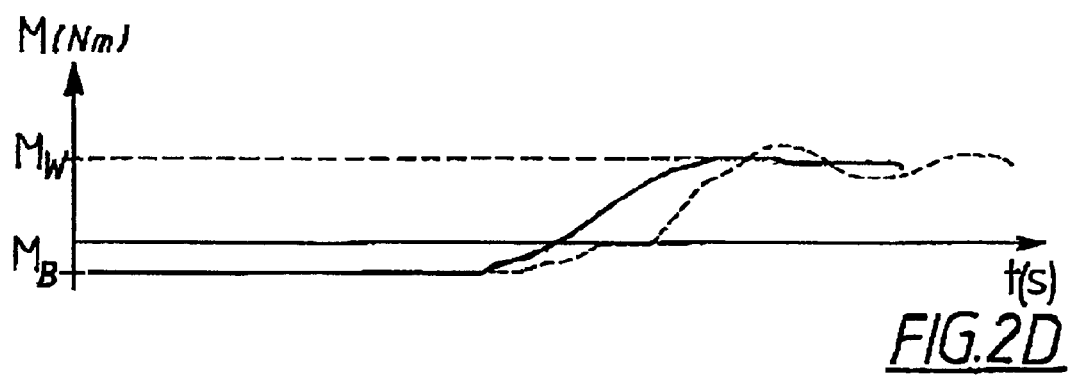
FIG. 2D illustrates a torque curve with torque delivered to the drive wheels.

FIG. 2D shows torque delivered to the drive wheels as a function of time. As can be seen from the diagram, the transition between braking torque $M_B$ and desired driving torque $M_W$ is gently achieved, without jerks or vibrations, by means of the invention.

As can be seen from FIG. 2B, which also shows torque delivered from the engine $M_C$ without the system according to the invention (illustrated by the broken line), the system allows engine response to be improved. In order to avoid or minimize jerks and vibrations, the torque delivered by the drive engine 1 to the drive line 2 should be increased more slowly during the change in load. This can be seen even more clearly in FIG. 2D, which also shows the torque delivered to the drive wheels without the system according to the invention (illustrated by the broken line). In this connection, it can be seen that the desired torque $M_W$ to the drive wheels can be delivered more rapidly and without torsional vibrations in the drive line if preloading of the play according to the invention is used.

In the event that situations arise for which the matrix of the control system has not been prepared, for example unexpected or extreme operating conditions with torques that are not included in the matrix, or wear of parts in the drive line that results in an increase overtime in the play on which the matrix was based, the matrix of the memory can be corrected. By means of one or more torque sensors 9–11 or, alternatively, the speed sensor (not shown) of the engine, the control system 4 can check the effect of the pulses delivered on the drive line 2. Suitable positions for the sensors 9–11 can be, e.g., close to the gearbox 5 or the axles of the drive wheels 7. Pulses from the control system 4 that are too great can result in the torque pulse from the electric motor 3 causing jerks or vibrations in the drive line 2, while pulses that are too small result in torque pulses that do not completely take up the play in the drive line 2. The control system 4, therefore, also measures the degree to which the torque pulse takes up the play in the drive line 2. The size of the pulses in the matrix in memory 12 can thus be corrected on the basis of how torque pulses from the electric motor 3 have taken up play in the line. For example, if wear in the drive line 2 leads to an increase in play, the value of the pulse size in the matrix will produce an inadequate torque pulse from the electric motor. The discrepancy can be measured by the torque sensor 9, the signal of which gives rise to an error message in the control system 4. Depending on the size of the error, the control system 4 calculates a new value for the height and/or duration of the pulse for the current operating conditions and includes this in the memory 12 matrix. In addition to correcting existing values of the height and/or duration of the pulse in the matrix, it is also possible to add new values for situations the matrix does not include. The system does not therefore, have direct feedback for continuous regulation, but is self-learning such that it adapts the functioning of the control system 4 by checking the effect of earlier sent pulses on the play in the drive line 2.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed is:

1. A method for taking up play in a drive system when a change in load occurs, the method comprising the steps of:
   coupling a drive engine to a drive line in a vehicle,
   acting on the drive engine and/or the drive line with a driving or braking torque by an electric motor, wherein the motor is coupled to the drive engine or constitutes a part of the drive line; and
   controlling the electric motor by a control system, wherein the control system sends a pulse to the electric motor when a change in load occurs, thereby prompting exactly one torque pulse from the electric motor to take up play in the drive line before torque from the drive engine occurs.

2. The method according to claim 1 further comprising the step of measuring torque applied to the drive line in current operating conditions.

3. A method for taking up play in a drive system when a change in load occurs, the method comprising the steps of:
   coupling a drive engine to a drive line in a vehicle,
   acting on the drive engine and/or the drive line with a driving or braking torque by an electric motor, wherein the motor is coupled to the drive engine or constitutes a part of the drive line;
   controlling the electric motor by a control system, wherein the control system sends a pulse to the electric motor when a change in load occurs, thereby prompting a torque pulse from the electric motor to take up play in the drive line before torque from the drive engine occurs, and
   measuring torque applied to the drive line in current operating conditions;
   selecting the height and/or duration of the pulse from a matrix in a memory based on the torque applied.

4. The method according to claim 3 further comprising the step of measuring the degree to which the torque pulse takes up the play in the drive line.

5. The method according to claim 4 further comprising the step of correcting the size of the pulse for the current operating conditions in said matrix on the basis of how the torque pulse from the electric motor has taken up the play.

6. The method according to claim 1 further comprising the step of sending the pulse when the change in load in the drive line goes from negative ($M_g$) to positive ($M_c$) torque.

7. A drive system for implementing the method according to claim 1, the drive system comprising:
   a drive engine coupled to a drive line in a vehicle,
   an electric motor able to act on the drive engine and/or the drive line with a driving or braking torque, and
   a control system for controlling the electric motor, wherein the control system, wherein the control system is arranged so as to send a short pulse to the electric motor when a change in load occurs, and wherein the electric motor generates exactly one torque pulse for the purpose of taking up play in the drive line before torque from the drive engine occurs.

8. The method according to claim 7 wherein the electric motor is further comprised of an integrated starter motor and generator.

9. A drive system for implementing the method according to claim 1, the drive system comprising:
   a drive engine coupled to a drive line in a vehicle,
   an electric motor comprised of an integrated started motor and generator and able to act on the drive engine and/or the drive line with a driving or braking torque, and
   a control system for controlling the electric motor, wherein the control system, wherein the control system is arranged so as to send a short pulse to the electric motor when a chance in load occurs, and wherein the electric motor generates a torque pulse for the purpose of taking up play in the drive line before torque from the drive engine occurs, wherein the control system is further comprised of a matrix stored in a memory, wherein the size and duration of the pulse are linked to different operating conditions.

10. The drive system according to claim 9 wherein the drive line is further comprised of at least one sensor for measuring the effect of the torque pulse on the play in the drive line.

11. The drive system according to claim 10 wherein the control system is arranged so as to correct the size of the pulse in the matrix in the light of measured values from said sensors.

12. The drive system according to claim 7 wherein the change in load occurs when the drive engine changes from engine braking to driving.

13. The drive system according to claim 7 wherein the drive engine is an internal combustion engine.

14. The drive system according to claim 7 wherein the electric motor is coupled to the drive engine.

15. The drive system according to claim 7 wherein the electric motor constitutes a part of the drive line.

16. A drive system arrangement for taking up play in a drive line when a change in load occurs in the drive system, the drive system arrangement comprising:
   a drive engine coupled to a drive line in a vehicle,
   an electric motor able to act on the drive engine and/or the drive line with a driving or braking torque, and
   a control system for controlling the electric motor and arranged so as to send a short pulse to the electric motor when a change in load occurs,
   wherein the electric motor generates exactly one torque pulse for the purpose of taking up play in the drive line before torque from the drive engine occurs.

17. The drive system arrangement according to claim 16 wherein the drive engine is an internal combustion engine.

18. The drive system arrangement according to claim 16 wherein the electric motor is coupled to the drive engine.

19. The drive system arrangement according to claim 16 wherein the electric motor constitutes a part of the drive line.

20. A drive system arrangement for taking up play in a drive line when a change in load occurs in the drive system, the drive system arrangement comprising:
   a drive engine coupled to a drive line in a vehicle,
   an electric motor able to act on the drive engine and/or the drive line with a driving or braking torque, and
   a control system for controlling the electric motor and arranged so as to send a short pulse to the electric motor when a change in load occur, wherein the control system is further comprised of a matrix stored in a memory, wherein the size and duration of the pulse are linked to different operating conditions,
   wherein the electric motor generates a torque pulse for the purpose of taking up play in the drive line before torque from the drive engine occurs.

21. The drive system arrangement according to claim 20 wherein the drive line is further comprised of at least one sensor for measuring the effect of the torque pulse on the play in the drive line.

22. The drive system arrangement according to claim 21 wherein the control system is arranged so as to correct the size of the pulse in the matrix in the light of measured values from said sensors.

23. The drive system arrangement according to claim 16 wherein the change in load occurs when the drive engine changes from engine braking to driving.

* * * * *

UNITED STATES PATENT AND TRADEMARK OFFICE
CERTIFICATE OF CORRECTION

PATENT NO. : 6,870,335 B2
DATED : March 22, 2005
INVENTOR(S) : Lindstrom et al.

It is certified that error appears in the above-identified patent and that said Letters Patent is hereby corrected as shown below:

Column 6,
Line 35, delete "wherein the control system," (first occurrence)
Line 53, delete "chance" and insert -- change --, therefor.

Column 8,
Line 10, after "is" delete "further".

Signed and Sealed this

Twelfth Day of July, 2005

JON W. DUDAS
*Director of the United States Patent and Trademark Office*